United States Patent
Yu et al.

(10) Patent No.: US 10,789,005 B2
(45) Date of Patent: Sep. 29, 2020

(54) SERVER AND ASSOCIATED COMPUTER PROGRAM PRODUCT USING DIFFERENT TRANMISSION SPEED FOR COLD DATA TANSMISSION

(71) Applicant: Silicon Motion Technology (Hong Kong) Limited, Kowloon (HK)

(72) Inventors: Tsung-Lin Yu, Yilan County (TW); Cheng-Yue Chang, New Taipei (TW); Po-Hsun Yen, Pingtung County (TW)

(73) Assignee: Silicon Motion Technology (Hong Kong) Limited, Kowloon (HK)

( * ) Notice: Subject to any disclaimer, the term of this patent is extended or adjusted under 35 U.S.C. 154(b) by 0 days.

(21) Appl. No.: 16/261,467

(22) Filed: Jan. 29, 2019

(65) Prior Publication Data
US 2020/0225865 A1 Jul. 16, 2020

(30) Foreign Application Priority Data
Jan. 16, 2019 (TW) .............................. 108101570 A

(51) Int. Cl.
*G06F 3/06* (2006.01)
(52) U.S. Cl.
CPC .......... *G06F 3/0647* (2013.01); *G06F 3/0604* (2013.01); *G06F 3/0674* (2013.01); *G06F 3/0679* (2013.01); *G06F 3/0682* (2013.01)
(58) Field of Classification Search
CPC .... G06F 3/0647; G06F 3/0682; G06F 3/0679; G06F 3/0674; G06F 3/0604
USPC ........... 711/154, 136, 133, 134, 135; 710/58
See application file for complete search history.

(56) References Cited

U.S. PATENT DOCUMENTS

| 6,862,618 B1* | 3/2005 | Gray ...................... H04L 45/00 370/468 |
|---|---|---|
| 10,524,022 B2* | 12/2019 | Rawal .................... H04Q 11/00 |
| 2002/0194609 A1* | 12/2002 | Tran ................. H04N 21/42692 725/95 |
| 2011/0252164 A1* | 10/2011 | Grundy ................... G06F 12/06 710/52 |
| 2012/0290779 A1* | 11/2012 | Eleftheriou ........... G06F 3/0616 711/103 |
| 2014/0040205 A1* | 2/2014 | Cometto ............... G06F 9/4411 707/639 |

(Continued)

FOREIGN PATENT DOCUMENTS

| CN | 102801690 B | 9/2015 |
|---|---|---|
| CN | 105653524 A | 6/2016 |
| CN | 106547477 A | 3/2017 |

*Primary Examiner* — Hong C Kim
(74) *Attorney, Agent, or Firm* — Winston Hsu

(57) ABSTRACT

The present invention provides a sever which includes a network interface, a processor and a first storage device, wherein the processor is arranged for communicating with an electronic device via the network interface, and the first storage device stores data. In the operations of the server, the processor determines whether the data is cold data; and when the data is determined as the cold data, the processor moves a second portion of the data to a second storage device, and a first portion of the data is remained in the first storage device, wherein the data amount of the first portion is less than data amount of the second portion, and the access speed of the first storage device is higher than the access speed of the second storage device.

17 Claims, 4 Drawing Sheets

(56) References Cited

U.S. PATENT DOCUMENTS

2014/0324920 A1* 10/2014 Hamilton .............. G06F 3/0605
707/812
2016/0140118 A1* 5/2016 Hasegawa ............. G06F 16/164
707/756
2017/0054455 A1* 2/2017 Goldberg .............. H03M 13/03

* cited by examiner

SERVER AND ASSOCIATED COMPUTER PROGRAM PRODUCT USING DIFFERENT TRANMISSION SPEED FOR COLD DATA TANSMISSION

BACKGROUND OF THE INVENTION

1. Field of the Invention

The present invention relates to a server and a computer program product installed onto the server.

2. Description of the Prior Art

Regarding a general web page server, since the capacity of the storage device is limited, some cold data which is not frequently used may be moved to another storage device, in order to prevent the cold data from occupying too much internal storage space of the web page server. However, when an external electronic device requests the web page server to read said cold data, since said cold data has been moved to the other storage device, the web page server must link to the other storage device to read the cold data and then transmit the read cold data to the external electronic device. Because the web page server needs to link to the other storage device in order to obtain the cold data, it takes longer preparation time to initiate transmitting the cold data to the external electronic device. What is even worse, the long preparation time may cause the request timeout, leaving inconveniences to the users.

SUMMARY OF THE INVENTION

Therefore, an objective of the present invention is to provide a server and associated computer program product, in order to solve the aforementioned problem.

An embodiment of the present invention discloses a server which comprises a network interface, a processor and a first storage device. The processor is arranged to communicate with an electronic device via the network interface. The first storage device is arranged to store data. The processor checks the data in order to determine whether the data is cold data, and when the data is determined as cold data, the processor reserves a first portion of the data in the first storage device, and moves a second portion of the data to a second storage device, wherein the data amount of the first portion of the data is smaller than the data amount of the second portion of the data, and the access speed of the first storage device is higher than the access speed of the second storage device. When the processor receives a request command from the electronic device via the network interface in order to request for reading the data, the processor directly transmits the first portion of the data to the electronic device via the network interface, and the transmission speed of the first portion of the data is lower than a permitted transmission speed between the server and the electronic device.

Another embodiment of the present invention discloses a computer program product arranged to be installed in a server. When a processor in the server executes the computer program product, the server performs an interacting operation upon an electronic device. The interacting operation comprises: checking data in first storage device in the server in order to determine whether the data belongs to cold data; when the data is determined as cold data, reserving a first portion of the data in the first storage device, and moving second portion of the data to a second storage device, wherein the data amount of the first portion is smaller than the data amount of the second portion, and the access speed of the first storage device is higher than the access speed of the second storage device; and when the processor receives a request command from the electronic device in order to request for reading the data, directly transmitting the first portion of the data to the electronic device, and the transmission speed of the first portion of the data is lower than a permitted transmission speed between the server and the electronic device.

Yet another embodiment of the present invention discloses a server which comprises a network interface, a processor and a first storage device. The processor is arranged to communicate with an electronic device via the network interface. The first storage device is arranged to store a first portion of data. When the processor receives a request command from the electronic device via the network interface in order to request for reading the data, the processor directly transmits the first portion of the data to the electronic device via the network interface, and the transmission speed of the first portion of the data is lower than an permitted transmission speed between the server and the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
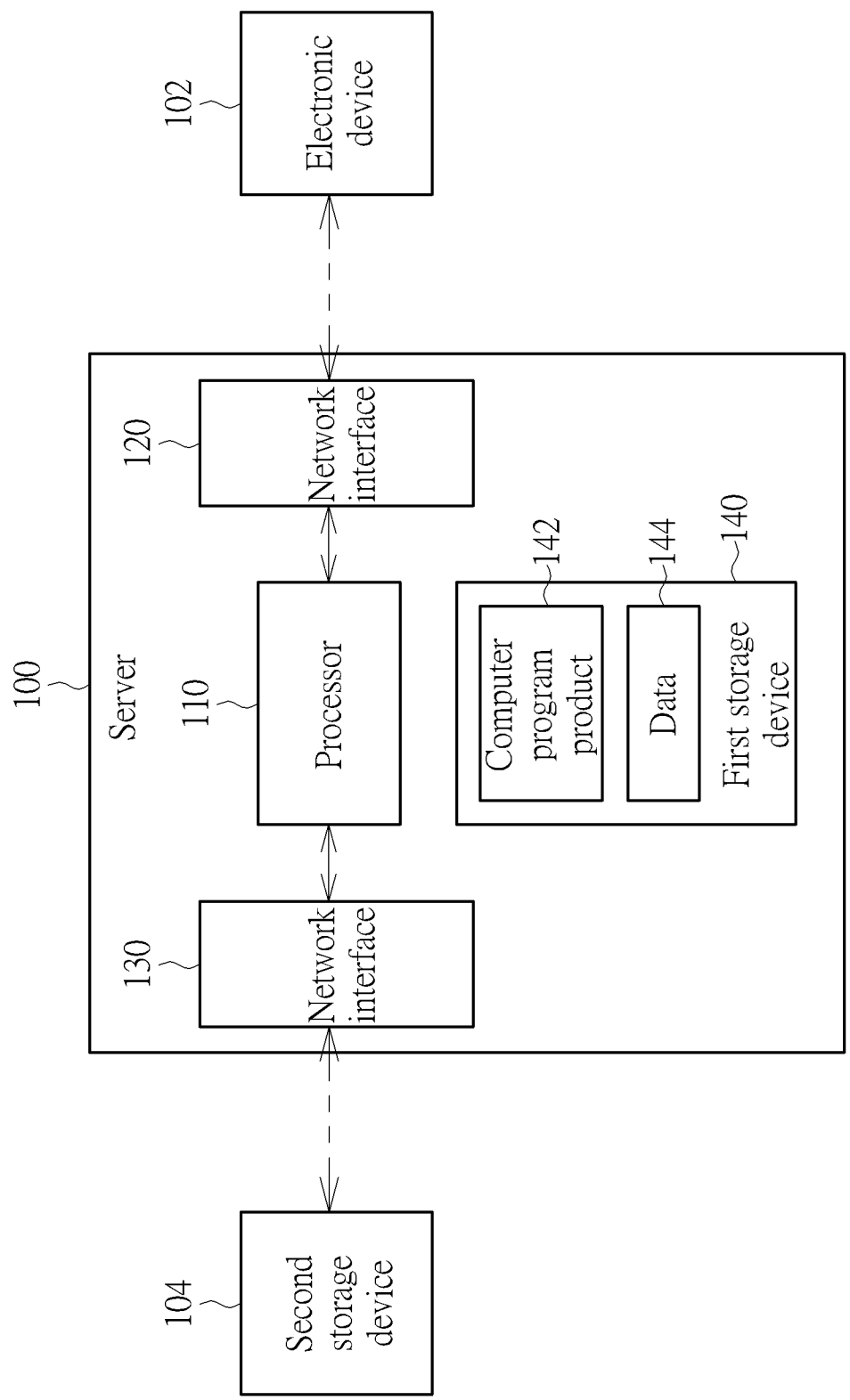
FIG. 1 is a diagram illustrating a server according to an embodiment of the present invention.

FIG. 1 is a diagram illustrating a server 100 according to an embodiment of the present invention. As shown in FIG. 1, the server 100 comprises a processor 110, at least two network interfaces 120 and 130, and a first the storage device 140, wherein the storage device 140 comprises a computer program product 142 and at least one data 144. In this embodiment, the server 100 is functioned as a file server, and the computer program product 142 may comprise at least one portion (e.g. part or all) of a file server software (e.g. "CEPH"; "radosgw" therein is used as an interface for connecting to an external device), and the processor 110 may perform the operations of the server 100 via executing the computer program product 142. Further, the server 100 may receive a reading request transmitted from an electronic device 102 via the network interface 120, such as receiving a HyperText Transfer Protocol (HTTP) reading request from an HTTP reading request of the user terminal (i.e. the electronic device 102), and may process the reading request in order to provide an HTTP response to the user terminal.

The server 100 may further connect to a second storage device 104 via the network interface 130, wherein the second storage device 104 has a larger capacity but a slower access speed, and is arranged to store cold data in the server 100. According to an embodiment, the second storage device 104 may be a tape library storage device, the network interface 130 may be an optical fiber network interface, and the server 100 may access the second storage device 104 via the optical fiber network interface. In another embodiment, the first the storage device 140 maybe a solid state disk (SSD), and the second storage device 104 may be a hard disk drive (HDD). It should be noted that the above two embodiments are merely for illustrative purposes, and are not meant to be limitations of the present invention. As long as the capacity of the second storage device 104 is larger than the first the storage device 140 and the access speed of the first the storage device 140 is higher than the second storage device 104, the first the storage device 140 and the second storage device 104 may also be implemented with other types of storage devices.

In the operations of the server 100, firstly, the processor 110 may periodically examine data in the first the storage device 140, or examine the first the storage device 140 when the server 100 is idle, so as to determine which data in said data is cold data. For example, the processor 110 may determine that whether each data in the first the storage device 140 has not been read by the electronic device 102 or other electronic devices for a certain period of time. If data is found not being read for a predetermined period, this data will be determined as cold data.

Figure 2:
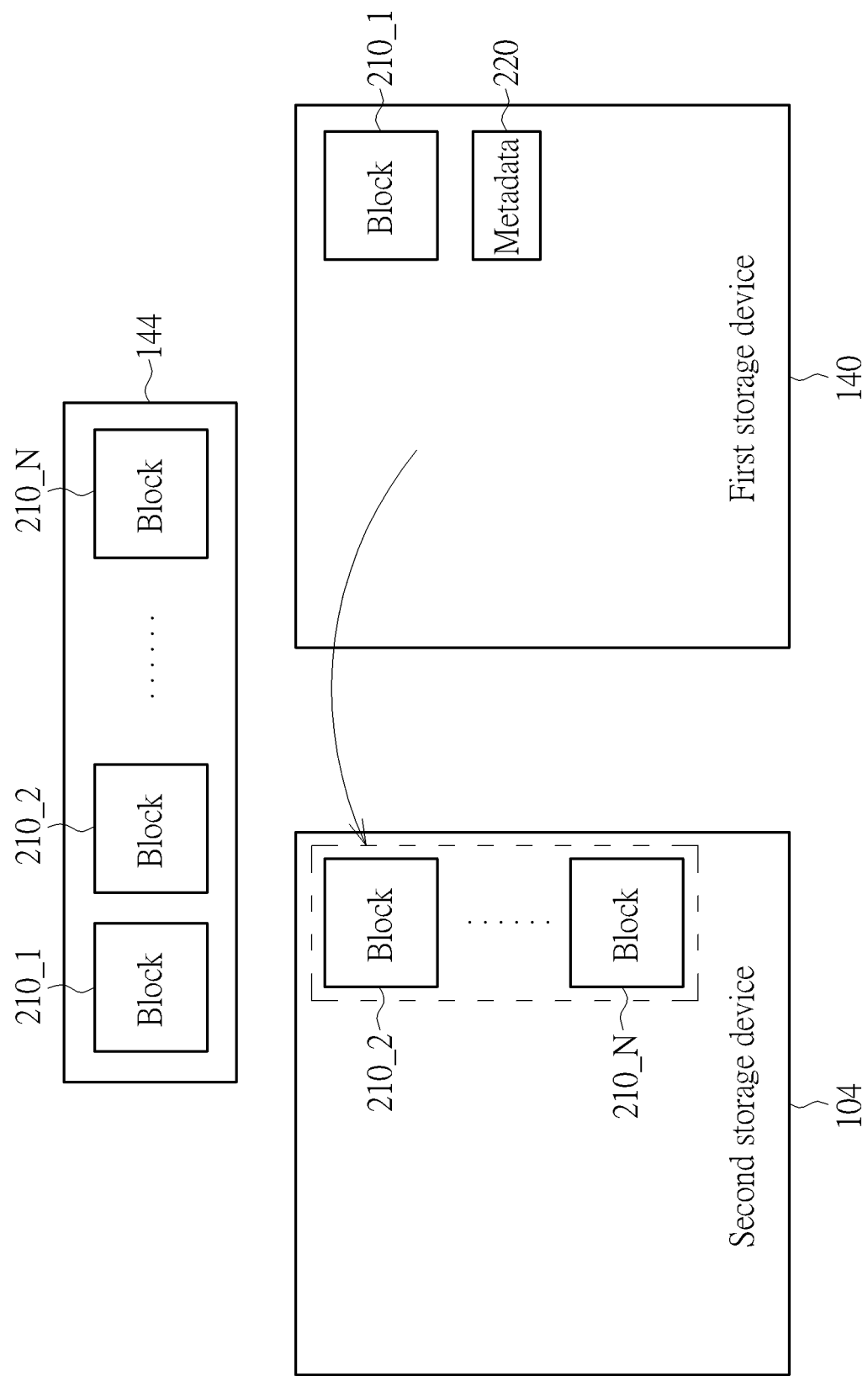
FIG. 2 is a diagram illustrating divide and store data into a first storage device and a second storage device.

This embodiment assumes that the processor 110 has determined the data 144 as cold data. Please further refer to FIG. 2, the processor 110 divides the data 144 into multiple portions (e.g. the blocks shown in FIG. 2). The processor 110 will reserve the first block 210_1 in the first the storage device 140, and moves the remaining blocks 210_2-210_N to the second storage device 104. Further, after the blocks 210_2-210_N are moved to the second storage device 104, the processor 110 will add metadata 220 into the first the storage device 140. The metadata 220 not only records most of the contents of the data 144 that have been moved to the second storage device 104, but also records the addresses of the blocks 210_2-210_N in the second storage device 104. The metadata 220 records the linking relationships between the first block 210_1 stored in the first the storage device 140 and the remaining blocks 210_2-210_N stored in the second storage device 104. In this embodiment, the data amount of the data 144 is large (e.g. exceeding a Gigabyte. The data amount of the block 210_1 is very small, for example, may be about 4 megabytes (MB).

In the above operations, since most contents of the data 144 have been moved to the second storage device 104, the loading of the first the storage device 140 of the server 100 may be reduced in a great extent.

Next, when the processor 110 receives a request command from the electronic device 102 via the network interface 120 in order to request for reading all contents of the data 144, since most contents of the data 144 have been moved to the second storage device 104, the processor 110 will transmit a reading request to the second storage device 104 in order to request for reading the blocks 210_2-210_N of the data 144. In order to avoid reading the second storage device 104 for too long, the processor 110 may immediately divide the block 210_1 stored in the first the storage device 140 into multiple sections, and then sequentially transmit said multiple sections of the block 210_1 to the electronic device 102 in an extremely slow rate, in order to avoid request timeout.

During the processor 110 transmitting said multiple sections of the block 210_1 to the electronic device 102, the transmission speed is lower than a permitted transmission speed between the server 100 and electronic device 102, and more particularly, the processor 110 is configured to deliberately prolong the interval between each of the sections transmitting to the electronic device 102 without causing the request timeout. More specifically, since the purpose that the processor 110 transmits the block 210_1 in a very slow speed is to prevent the duration of the server 100 reading the second storage device 104 from being too long which may cause the request timeout, the selection on the duration of the processor 110 transmitting the block 210_1 is preferably not to reach the request timeout, but should be as close as possible. That is, how to determine the transmission speed of the block 210_1 is not relevant to the current transmission speed permitted by the server 100, nor relevant to the bandwidth levels of the server 100 occupied by other electronic devices. For example, assume the duration of the request timeout is 60 seconds, the processor 110 may transmit a portion of the contents (could be a small data amount, such as 56 KB, 128 KB, etc.) in the block 210_1 to the electronic device 102 every 30-50 seconds.

Figure 3:
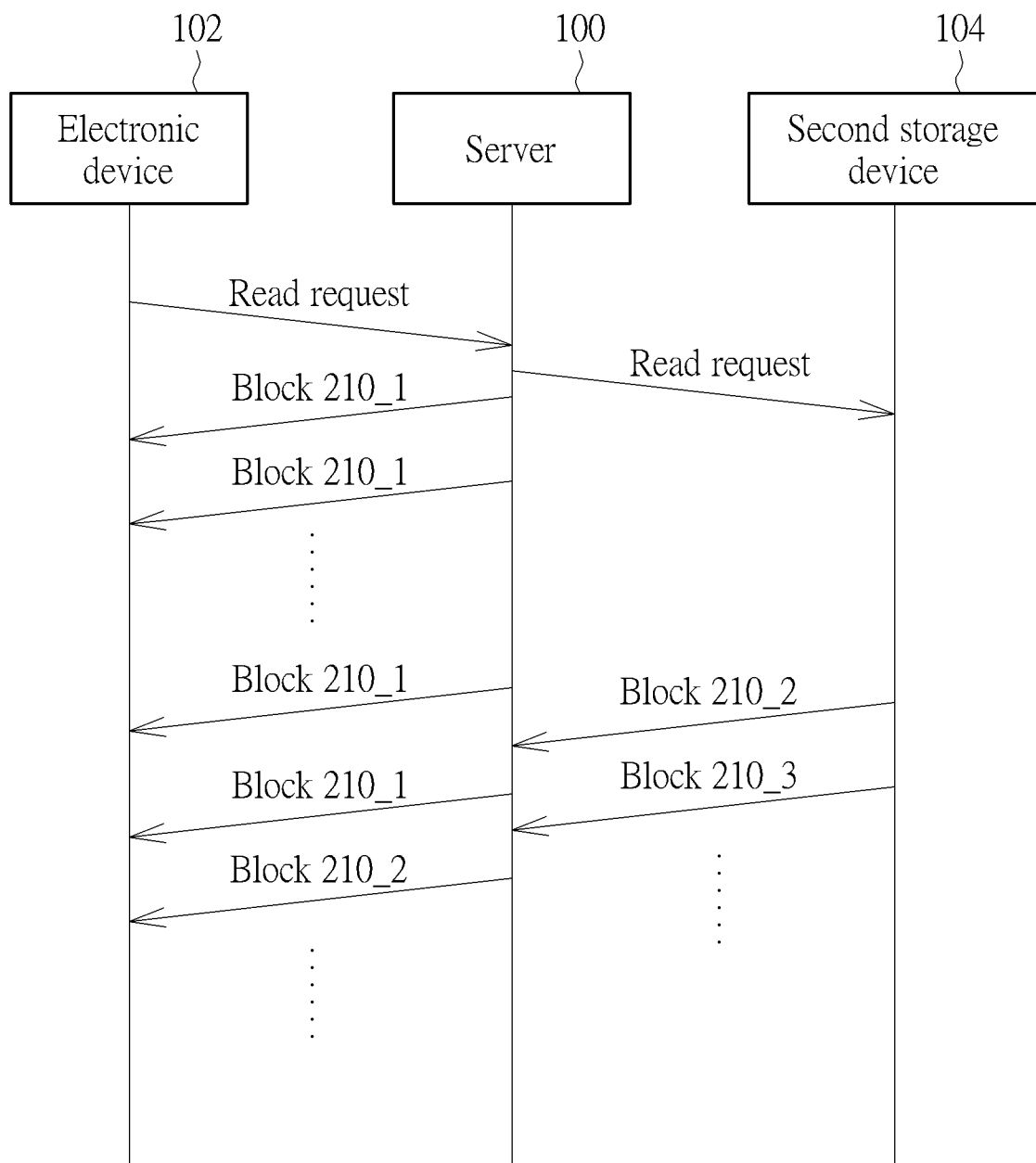
FIG. 3 is a timing diagram illustrating the data transmission between the server in the above embodiment, an electronic device and a second storage device.

Since the purpose of using a very slow speed to transmit the block 210_1 to the electronic device 102 is to postpone the procedure, in order to wait for the second storage device 104 to send back the blocks 210_2-210_N, once the processor 110 begins to receive the contents of the block 210_2, the processor 110 may increase the speed of transmitting the remaining sections of the block 210_1k, e.g. using the highest permitted speed to transmit to the electronic device 102, and then sequentially transmit the contents of the blocks 210_2-210_N from the second storage device 104 to the electronic device 102. FIG. 3 is a timing diagram illustrating the data transmission between the server 100 in the above embodiment, an electronic device 102 and a second storage device 104.

In an embodiment, when transmitting the first section of the block 210_1 to the electronic device 102, the processor 110 may further add the duration of the request timeout to the header information, such as 60 or 120 seconds, for the reference of the electronic device 102.

Figure 4:
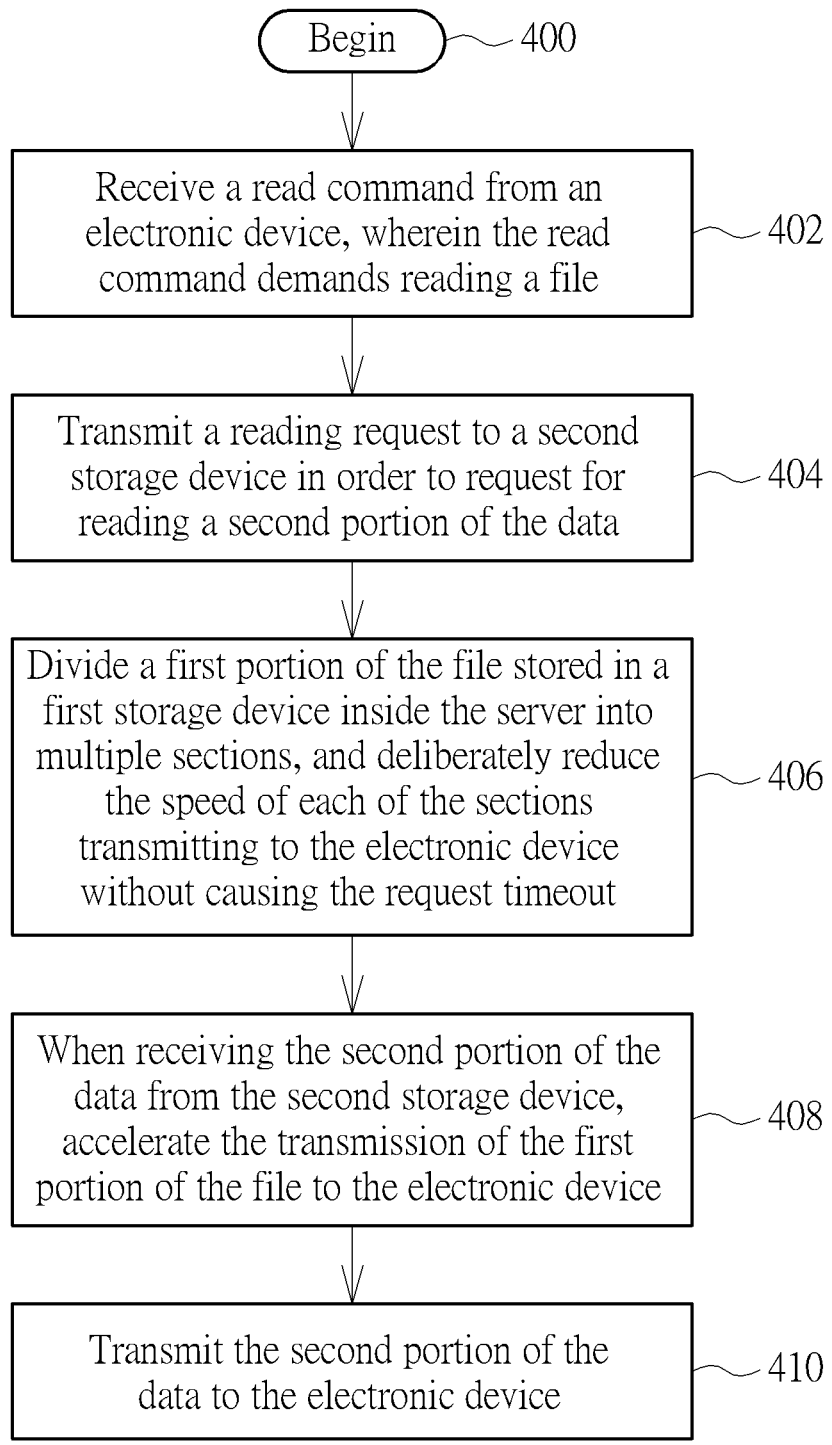
FIG. 4 is a flowchart illustrating the data accessing of a server according to an embodiment of the present invention.

FIG. 4 is a flowchart illustrating the data accessing of a server according to an embodiment of the present invention. The flow of the data access of the server can be referred to the above embodiments, and can be briefed as follows.

Step 400: The flow begins.

Step 402: Receive a read command from an electronic device, wherein the read command demands reading a file.

Step 404: Transmit a reading request to a second storage device in order to request for reading a second portion of the data.

Step 406: Divide a first portion of the file stored in a first storage device inside the server into multiple sections, and deliberately reduce the speed of each of the sections transmitting to the electronic device without causing the request timeout.

Step 408: When receiving the second portion of the data from the second storage device, accelerate the transmission of the first portion of the file to the electronic device.

Step 410: Transmit the second portion of the data to the electronic device.

To briefly summarize the present invention, regarding the server of the present invention and associated computer program product, when data in first storage device of the server is determined as cold data, a first portion of the data is reserved in the first storage device, and a second portion of the data is moved to a second storage device that has larger capacity but a slower access speed. After that, when receiving a reading request of an electronic device, the first portion will be transmitted slowly to the electronic device in order to avoid the time of reading the second storage device from being too long which would cause the request timeout. Later, after the second storage device sends back the second portion of the data, the speed of transmitting the data to the electronic device can be increased. Hence, the present invention may utilize the storage space of the server in a more efficient way to prevent the reading request of the electronic device from being invalid (i.e. the request timeout).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A server, comprising:
a network interface;
a processor, arranged to communicate with an electronic device via the network interface; and
a first storage device, arranged to store data;
wherein the processor checks the data in order to determine whether the data is cold data; when the data is determined as cold data, the processor reserves a first portion of the data in the first storage device, and moves a second portion of the data to a second storage device; and the data amount of the first portion of the data is smaller than the data amount of the second portion of the data, and an access speed of the first storage device is higher than an access speed of the second storage device;
wherein when the processor receives a request command from the electronic device via the network interface in order to request for reading the data, the processor directly transmits the first portion of the data to the electronic device via the network interface, and the transmission speed of the first portion of the data is lower than a permitted transmission speed between the server and the electronic device;
wherein when the processor receives the request command from the electronic device via the network interface in order to request for reading the data, the processor divides the first portion of the data into multiple sections, and extends the interval between each of the sections transmitting to the electronic device without causing request timeout.

2. The server of claim 1, wherein the second storage device is a tape library storage device.

3. The server of claim 1, wherein the first storage device is a solid state disk (SSD), and the second storage device is a hard disk drive (HDD).

4. The server of claim 1, wherein during moving the second portion of the data to the second storage device, the processor creates metadata in the first storage device in order to record a linking relationship between the first portion of the data of the first storage device and the second portion of the data stored in the second storage device.

5. The server of claim 1, wherein when the processor receives the request command from the electronic device via the network interface in order to request for reading the data, the processor transmits a reading request to the second storage device in order to request for reading the second portion of the data; and before the processor receives the second portion of the data sent back from the second storage device, the processor transmits the first portion of the data to the electronic device in a transmission speed lower than the permitted transmission speed.

6. The server of claim 5, wherein after the processor receives the second portion of the data sent back from the second storage device, the processor increases the transmission speed of the first portion of the data.

7. A computer program product, stored in a non-transitory medium and arranged to be installed in a server, and when a processor in the server executes the computer program product, the server performs an interacting operation upon an electronic device, wherein the interacting operation comprises:
checking data in first storage device in the server in order to determine whether the data belongs to cold data;
when the data is determined as cold data, reserving a first portion of the data in the first storage device, and moving a second portion of the data to a second storage device, wherein the data amount of the first portion is smaller than the data amount of the second portion, and an access speed of the first storage device is higher than an access speed of the second storage device; and
when the processor receives a request command from the electronic device in order to request for reading the data, directly transmitting the first portion of the data to the electronic device, and a transmission speed of the first portion of the data is lower than a permitted transmission speed between the server and the electronic device;
wherein the step of directly transmitting the first portion of the data to the electronic device via the network interface comprises:
dividing the first portion of the data into multiple sections, and extending the interval between each of the sections transmitting to the electronic device without causing request timeout.

8. The computer program product of claim 7, wherein the second storage device is a tape library storage device.

9. The computer program product of claim 7, wherein the first storage device is a solid state disk (SSD), and the second storage device is a hard disk drive (HDD).

10. The computer program product of claim 7, further comprising:
during moving the second portion of the data to the second storage device, creating metadata in the first storage device in order to record a linking relationship between the first portion of the data of the first storage device and the second portion of the data stored in the second storage device.

11. The computer program product of claim 7, wherein the interacting operation further comprises:
transmitting a reading request to the second storage device in order to request for reading the second portion of the data; and
before the processor receives the second portion of the data sent back by the second storage device, the processor keeps a transmission speed of transmitting the first portion of the data to the electronic device to be lower than the permitted transmission speed.

12. The computer program product of claim 11, wherein the interacting operation further comprises:
after the processor receives the second portion of the data sent back by the second storage device, the processor increases the transmission speed of the first portion of the data.

13. A server, comprising:
a network interface;
a processor, arranged to communicate with an electronic device via the network interface; and
a first storage device, arranged to store a first portion of data;

wherein when the processor receives a request command from the electronic device via the network interface in order to request for reading the data, the processor directly transmits the first portion of the data to the electronic device via the network interface, and a transmission speed of the first portion of the data is lower than a permitted transmission speed between the server and the electronic device;

wherein when the processor receives the request command from the electronic device via the network interface in order to request for reading the data, the processor divides the first portion of the data into multiple sections, and extends the interval between each of the sections transmitting to the electronic device without causing request timeout.

14. The server of claim 13, wherein when the processor receives the request command from the electronic device via the network interface in order to request for reading the data, the processor transmits a reading request to the second storage device in order to request for reading the second portion of the data, wherein the data amount of the first portion is smaller than the data amount of the second portion, and the access speed of the first storage device is higher than the access speed of the second storage device; and before the processor receives the second portion of the data sent back from the second storage device, the processor continues to transmit the first portion of the data to the electronic device in a transmission speed lower than the permitted transmission speed.

15. The server of claim 14, wherein after the processor receives the second portion of the data sent back from the second storage device, the processor increases the transmission speed of the first portion of the data.

16. The server of claim 13, wherein the second storage device is a tape library storage device.

17. The server of claim 13, wherein the first storage device is a solid state disk (SSD), and the second storage device is a hard disk drive (HDD).

* * * * *